(12) United States Patent
Wolfe et al.

(10) Patent No.: US 7,179,766 B2
(45) Date of Patent: Feb. 20, 2007

(54) METHOD AND APPARATUS FOR PRODUCTION OF ENROBED CATALYST PASTILLES OR FLAKES

(75) Inventors: David C. Wolfe, Louisville, KY (US); Paul D. Schneider, Louisville, KY (US); Robert O'Brien, Louisville, KY (US); X. D. Hu, Louisville, KY (US); Jeff Braden, New Albany, IN (US); Patrick McLaughlin, New Albany, IN (US); Joe Stack, Lagrange, KY (US)

(73) Assignee: Sud-Chemie Inc., Louisville, KY (US)

( * ) Notice: Subject to any disclaimer, the term of this patent is extended or adjusted under 35 U.S.C. 154(b) by 0 days.

(21) Appl. No.: 10/750,354

(22) Filed: Dec. 31, 2003

(65) Prior Publication Data

US 2004/0157731 A1    Aug. 12, 2004

Related U.S. Application Data

(63) Continuation-in-part of application No. 10/324,561, filed on Dec. 19, 2002, now Pat. No. 6,979,663.

(51) Int. Cl.
*B01J 31/00* (2006.01)

(52) U.S. Cl. ..................................... 502/159
(58) Field of Classification Search ............ 502/159
See application file for complete search history.

(56) References Cited

U.S. PATENT DOCUMENTS 4,874,667 A  * 10/1989 Lee et al. .............. 428/402.22
5,009,957 A  *  4/1991 Lee et al. .............. 428/402.22
5,298,579 A  *  3/1994 Hoff et al. .................. 526/116
5,955,587 A  *  9/1999 Weuthen ..................... 536/18.6
6,124,230 A  *  9/2000 Speca et al. ................. 502/111
6,224,793 B1 *  5/2001 Hoffman et al. ............. 264/4.1
6,458,296 B1 * 10/2002 Heinzen et al. ................ 264/9
6,624,204 B1 *  9/2003 Daage et al. ............... 518/709
6,884,746 B2 *  4/2005 Ko et al. .................... 502/103
6,894,160 B2 *  5/2005 Capan et al. ............... 536/55.3

FOREIGN PATENT DOCUMENTS

WO     WO 01/98375 A1 * 12/2001

OTHER PUBLICATIONS

Kobayashi and Nagayama, "A Microencapsulated Lewis Acid. A New Type of Polymer-Supported Lewis Acid Catalyst of Wide Utility in Organic Synthesis", J. Am. Chem. Soc. (1998) 120, 2985-2986.*

* cited by examiner

*Primary Examiner*—J. A. Lorengo
*Assistant Examiner*—Veronica Faison-Gee
(74) *Attorney, Agent, or Firm*—Joan L. Simunic

(57) ABSTRACT

The present development relates to a process for enrobing active catalytic materials with a protective coating to form pastilles, and to an apparatus for making the pastilles. The process comprises mixing an active catalyst powder with a hydrocarbon material in a low-shear jacketed blender at a temperature slightly above the congealing point of the hydrocarbon, and then making pastilles from the catalyst/hydrocarbon mixture while cooling the mixture to temperature below the congealing point of the hydrocarbon.

20 Claims, No Drawings

METHOD AND APPARATUS FOR PRODUCTION OF ENROBED CATALYST PASTILLES OR FLAKES

CROSS-REFERENCE TO RELATED APPLICATIONS

The present application is a continuation-in-part application related to U.S. application Ser. No. 10/324,561 filed on Dec. 19, 2002 now U.S. Pat. No. 6,979,663 and incorporated herein in its entirety by reference.

BACKGROUND

The present development relates to a process for enrobing active catalytic materials with a protective coating to form pastilles, and to an apparatus for making the pastilles. The pastilles are prepared using a low-shear jacketed blender and a pastillator. The resultant pastilles vary in shape and have a diameter of from about 2 mm to about 100 mm and a thickness of 1 mm to 10 mm.

Heterogeneous catalysts often include an active phase that is unstable in air. For example, highly reduced metal crystallites, such as cobalt crystallites having from about a 45% to about 90% reduction, are pyrophoric and are susceptible to oxidation. Further, the heterogeneous catalyst may be in the form of a reduced catalyst powder having a catalyst crystallite particle size of from about 50 microns to about 150 microns. This small particle size combined with the catalyst instability in air can make the catalysts difficult to handle and can create safety hazards when the catalysts are being loaded into a reactor. Heterogeneous catalysts can also experience a temperature rise from the internal section of the catalyst which can cause oxidation of the active metal to an inactive metal oxide. This oxidation is undesirable for the reaction and can cause sintering of the metal on the catalyst as well. Thus, there is a need to find a means for protecting the reduced metal catalyst.

One common method used to protect the reduced metal catalyst is to form an oxide surface film on the catalyst by treating the reduced catalyst in a mixture of air and an inert gas. This procedure must be performed with extreme care because any surge of exotherm will cause sintering of the metal on the catalyst. Usually, the procedure starts with a very low oxygen concentration in a largely $N_2$ (or other inert gas) stream; the oxygen concentration is then gradually increased by increasing air/inert gas ratio over a period of time, typically from about 24 hours to about 150 hours. In addition to the exotherm risks, another disadvantage of using this method for protecting the catalyst is that a portion of the reduced metal is typically lost due to formation of metal oxides.

A more sophisticated method involves enrobing the reduced catalyst in oxygen impermeable media such as organic solvents, oils, fats and waxes. The enrobing or coating material works as an oxygen and moisture barrier to protect the metal being oxidized. By coating the catalyst, it is possible to stabilize the active material and to make handling the material easier. Further, the enrobing method allows essentially 100% of the reduced metal to be preserved.

The practice of coating or enrobing the active materials in a protective sheath is well known in the prior art. As early as 1952, a method for improving the coating of reduced nickel catalysts was taught in U.S. Pat. No. 2,609,346 (issued to Faulkner on Sep. 2, 1952). In the '346 patent, reduced nickel, usually containing a promoter, is dispersed in glyceride fat having a melting point from about 105° F. up to about 150° F. The mixture of catalyst and fat is melted at a temperature of about 160° F. to about 175° F., and then is cast in a metal form cooled to a temperature of between 50° F. and 60° F. to form a block of coated catalyst. Although this method produces an enrobed catalyst, the catalyst/fat mixture is formed into relatively large shapes that must be rapidly cooled to ensure that the wax is hardened throughout the block thereby preventing the catalyst from settling.

U.S. Pat. No. 2,842,504 (issued to Jones on Jul. 8, 1958) teaches a different method of coating a catalyst. In the '504 patent, a nickel-kieselguhr hydrogenation catalyst is coated with a rubbery polymer. The catalyst is added to a polymer/organic solvent solution and a rubber coat is formed on the catalyst by driving the organic solvent off. U.S. Pat. No. 3,453,217 (issued to Kozlowski et al on Jul. 1, 1969) describes a method of treating a catalyst with a liquid hydrocarbon having a boiling point in the range of 410° F. to 1200° F. The hydrocarbon is applied to the catalyst by discharging the catalyst into a container containing the liquid hydrocarbon and then moving the catalyst out of the container on a moving belt screen. If the process is carried out properly, the hydrocarbon fills the micropores of the catalyst. A somewhat different approach is taught in U.S. Pat. No. 6,294,498 (issued to Darcissac et al on Sep. 25, 2001). In the '498 patent, a catalyst is coated with a protective layer that is "atomized or dispersed on the catalyst by continuously stirring the catalyst and keeping it at a temperature that is below the crystallization point of the coating material". Alternatively, the coating material may be in a solution that is "atomized, sprayed or dispersed by continuously stirring the catalyst at a temperature that is above the boiling point of the solvent of said solution." Each of these methods result in the application of a protective coating on a catalyst. However, these methods either require specialized coatings or relatively sophisticated handling to ensure that the coating is deposited as intended.

SUMMARY OF THE INVENTION

The present development relates to a process and an apparatus for enrobing an active catalyst in a protective coating material and making distinct pastilles or flakes. The process comprises blending, transferring, feeding and pastillation or flaking steps. An essentially constant temperature, from about 0° F. (at the congealing point) to about 50° F. above the congealing point of the coating material, is maintained during the blending, transferring and feeding steps. The temperature is gradually decreased as the pastilles or flakes proceed through the pastillation or flaking step so that the discharge temperature from the pastillator or flaker is from about 2° F. to about 150° F. lower than the congealing point of the coating material.

The apparatus comprises a low-shearing jacketed blender and a pastillator. The low-shear jacketed blender allows for gentle mixing action at a controlled constant temperature so that the catalyst powder is submerged in the coating material in a softened state and the catalyst is uniformly mixed with the coating material without the catalyst being ground or subjected to attrition. The mentioned features of the blender are beneficial when a microspherical catalyst powder is used in fluid bed applications.

DETAILED DESCRIPTION OF THE PREFERRED EMBODIMENT

The present development relates to a process and an apparatus for applying a protective coating material over an active catalyst to form pastilles or flakes. According to the invention, oxygen- or moisture-sensitive catalyst powder is combined with a coating material using a low-shear jacketed blender, and the catalyst/coating mixture is then processed through a pastillator or flaker. In the present development, the example blender used is a horizontal blender, but any piece of equipment that can provide uniform, low-shear mixing may be used. As used herein, unless otherwise specified, any reference to pastilles or drops, pastillation or pastillator should be interpreted to apply as well to flakes, flaking or flaker, respectively.

The catalyst is preferably in a powdered, and optionally, reduced form. For example, in an embodiment of the invention, the catalyst is a highly reduced cobalt crystallite having an average particle size of from about $1\mu$ to about $225\mu$, and preferably from about $3\mu$ to about $150\mu$. The particle size may range from about $1\mu$ to about $200\mu$, the constraint on the upper limit being determined by the dimensions of the opening to a feed port of the pastillator.

The hydrocarbon compound, or coating material, can be any material that can create an oxygen- and/or moisture barrier for the catalyst. For example, the hydrocarbon may be selected from epoxy resin, fatty acids, fatty alcohols, fatty esters, fatty stearates, hydrocarbon resins, microcrystalline paraffins, paraffin wax, synthetic wax, polyesters, polyethylene glycol, polyethylene waxes, polyglycols, polyvinyl alcohols, polystyrene, vegetable waxes, a wax obtained from processes using coal, natural gas, bio-mass, or methanol as feedstock, wax blends and combinations thereof. A preferred coating material is a synthetic wax, such as the wax from a Fischer-Tropsch reaction, that contains a small amount antioxidant and is essentially free of inorganic contaminants such as sulfur, chloride and heavy metals.

In the present invention, the coating material is selected based on, among other criteria, its purity and its ability to form a solid at ambient temperature. Further, the coating material preferably has a congealing point of from about 110° F. to about 250° F., and more preferably from about 150° F. to about 225° F. As used herein, the congealing point refers to the hardening or softening characteristics of the hydrocarbon or coating material. The congealing point is obtained by solidification of liquid based on ASTM-938 or equivalent methods. The solidification characteristics of wax can also be expressed as drop melting point (ASTM-3954 and ASTM-D127) or cooling curve (ASTM-D87). The difference between congealing point and melting point is highly dependent on molecular weight and molecular weight distribution of the individual hydrocarbon compound. Melting point could be several degrees higher than congealing point.

According to the invention, the catalyst powder is combined with the coating material using the low-shear jacketed blender. As is known in the art, the blender with the coating material is purged with an inert gas and the catalyst powder is then added. If, as is the case with the prior art enrobed catalysts, the catalyst material is in the form of flakes or generally has a form in which the density of the catalyst is lower than the density of the coating material, e.g. the density of the catalyst may be about 0.3 g/cc and the density of the coating material is about 0.7 g/cc, then settling is not a problem. In the present invention, however, the catalyst may be in the form of particles that generally have a density greater than density of the coating material, e.g. the density of the catalyst is generally about 1.2 g/cc and the density of the coating material is about 0.7 g/cc, so that settling can occur if the wax is not kept in a "semi-solid" state. To maintain the semi-solid state, the temperature of the low-shear jacketed blender, such as without limitation a Ross horizontal blender (Ross Paddle Blender, Ross Ribbon Blender or Ross Cylindrical Drier), is heated to and held at a temperature that is from about 0° F. (at the congealing point) to about 50° F. above the congealing point of the coating material.

The coating material is manually or automatically fed to the low-shear jacketed blender, as is known in the art. The coating material does not need to be heated prior to its introduction to the blender. In the blender, the coating material is heated to a semi-solid state, wherein the material is softened or molten, but not a liquid. The entire system is then purged with an inert gas, such as $N_2$. The semi-solid unseparated mixture deposits at the blender end of the pastillator a plurality of drops or flakes of the mixture.

The catalyst powder is then blended into the coating material. The concentration of the catalyst relative to the coating material can vary depending on the catalyst, the coating material and the anticipated method of use, and may range in concentration from essentially no catalyst powder (pure wax pastilles) to concentrations of up to about 65 wt %. In one example, a highly reduced alumina supported cobalt crystallite having an average particle size of from about $50\mu$ to about $150\mu$ is mixed into a synthetic paraffin wax at an average concentration of about 57 wt % catalyst.

The low shear mixing from the blender combined with proper paddle clearance allows the reduced catalyst powder to be submerged into the coating material and to be uniformly dispersed throughout the coating material without grinding or milling of the catalyst. As is known in the art, the blender includes internal paddles or ribbons that rotate to produce the mixing action. As the paddles rotate, there is a risk that the catalyst can be ground or milled by the action of the paddles against the internal wall of the blender. Thus, in the present invention, the rotation direction, rotation speed, and design as well as the clearance between the tips of rotating paddles or ribbons and the interior wall of the blender is set to minimize the catalyst attrition.

The mixing intensity may vary but should be selected to minimize damage to the catalyst. In one example, the mixing intensity is set at from about 3 to about 10 revolutions per minute. Typically, the residence time in the blender is from about 2 minutes to about 120 minutes, and preferably is from about 2 minutes to about 90 minutes.

After mixing in the blender, the blended material is transferred through piping and by a series of low shear pumps that each aid in the prevention of material settling and separating until the blended material is fed into a pastillator, such as the Sandvik Rotoformer Serial 81750/88. The piping and pumps are jacketed and/or heat-traced to maintain essentially the same temperature as the blender or a temperature sufficient to maintain the hydrocarbon coating material in the semi-solid or molten phase. Here, as in the blender, because the catalyst particles being enrobed have a greater density than the coating material, if the coating material is overheated, it is possible to have the catalyst settle out of the coating material. Thus, it is a key feature of the development that the temperature be maintained such that the coating material is in the semi-solid state during the transfer process.

In the pastillator, the catalyst/coating mixture is deposited drop-wise through a feed port by a Rotoformer onto a steel belt cooler, forming a plurality of pastilles or flakes. The belt cooler carries the pastilles or flakes a predetermined length across a water cooled bed. Because the belt cooler is chilled along the majority of its length, by the time the pastilles reach the end of the belt and they are discharged from the pastillator, the hydrocarbon phase of the pastille has solidified to form distinct particles of active catalyst powder dispersed within the coating material. The discharge temperature is preferably from about 2° F. to about 150° F. lower than the congealing point of the coating material.

The size of the pastilles or flakes to be formed can be modified by altering the size of the opening from the Rotoformer. Further, the resultant particles can have a variety of shapes, such as spherical, hemispherical, ellipsoidal, oval, domed, any other shapes known in the art of pastillation, including flakes, and combinations thereof. The pastilles preferably have a diameter of from about 2 mm to about 100 mm and a thickness of from about 1 mm to about 10 mm.

The pastille preparation method of the present invention is intended for use in enrobing active catalyst in a protective material. The method differs from the catalyst enrobing methods of the prior art by allowing relatively large catalyst particles to be enrobed in a hydrocarbon coating. Further, the present invention provides a method wherein the catalyst particles are essentially unaffected by the enrobing process, i.e. they are not ground or subject to attrition in the process. The catalysts enrobed by the method can be used for a number of applications, including but not limited to fluid bed or slurry bed or bubble column reactor applications.

It is understood that the composition of the pastilles and the specific processing conditions may be varied without exceeding the scope of this development.

What is claimed is:

1. A catalyst pastille comprising an active powdered catalyst coated with a protective hydrocarbon coating material such that an essentially oxygen- and/or moisture barrier is created for the powdered catalyst, wherein said powdered catalyst has an average particle size of from about 1μ to about 225μ, and wherein said powdered catalyst defines a density and said coating material defines a density and the density of said powdered catalyst is greater than the density of said coating material, and wherein said catalyst pastille is prepared by the process comprising the steps of:
    a. combining a hydrocarbon material having a congealing point of from about 110° F. to about 250° F. with said powdered catalyst in a low-shear jacketed blender to form a mixture wherein said catalyst is uniformly dispersed throughout said hydrocarbon, said low-shear jacketed blender selected to minimize catalyst attrition and being set to maintain a temperature that is from about 0° F. to about 50° F. above the congealing point of said hydrocarbon material;
    b. transferring said mixture from said low-shear jacketed blender to a pastillator at a temperature sufficient to maintain said hydrocarbon material in a semi-solid phase so as to avoid settling of the powdered catalyst; and
    c. depositing at a blender end of said pastillator a plurality of drops of said mixture onto a steel belt cooler of predetermined length, and transporting said drops to a discharge end of said pastillator while cooling said drops to a temperature low enough to solidify said hydrocarbon phase to form pastilles having a diameter of from about 2 mm to about 100 mm and a thickness of from about 1 mm to about 10 mm, and wherein said powdered catalyst is uniformly dispersed throughout said hydrocarbon material.

2. The catalyst pastille of claim 1 wherein said pastilles are spherical, hemispherical, ellipsoidal, oval, domed, flakes and combinations thereof.

3. The catalyst pastille of claim 1 wherein said low-shear jacketed blender maintains a temperature that is from about 0° F. to about 20° F. above the congealing point of said hydrocarbon material.

4. The catalyst pastille of claim 1 wherein said blender has at least one paddle and said paddle is positioned within said blender so as to minimize attrition of said catalyst.

5. The catalyst pastille of claim 1 wherein said powdered catalyst is reduced.

6. The catalyst pastille of claim 1 wherein said hydrocarbon material is selected from epoxy resin, fatty acids, fatty alcohols, fatty esters, fatty stearates, hydrocarbon resins, microcrystalline paraffins, synthetic wax, paraffin wax, polyesters, polyethylene glycol, polyethylene waxes, polyglycols, polyvinyl alcohols, polystyrene, vegetable waxes, a wax obtained from processes using coal, natural gas, biomass, or methanol as feedstock, a synthetic wax produced from a Fischer-Trospch reaction, wax blends and combinations thereof.

7. A catalyst pastille comprising an active powdered catalyst coated with a protective hydrocarbon coating material such that an essentially oxygen- and/or moisture barrier is created for the powdered catalyst, wherein said powdered catalyst defines a density and said coating material defines a density and the density of said powdered catalyst is greater than the density of said coating material, and wherein said powdered catalyst is uniformly dispersed throughout said coating material, and wherein said catalyst pastille is prepared by the process comprising the steps of:
    a. combining a hydrocarbon material having a congealing point with a powdered catalyst in a low-shear jacketed blender to form a mixture wherein said catalyst is uniformly dispersed throughout said hydrocarbon, said low-shear jacketed blender being set to maintain a temperature that is from about 0° F. to about 50° F. above the congealing point of said hydrocarbon material;
    b. transferring said mixture from said low-shear jacketed blender to a pastillator at a temperature sufficient to maintain said hydrocarbon material in the semi-solid phase so as to avoid settling of the powdered catalyst; and
    c. depositing at a blender end of said pastillator a plurality of drops of said mixture onto a steel belt cooler of predetermined length, and transporting said drops to a discharge end of said pastillator while cooling said drops to a temperature low enough to solidify said hydrocarbon phase to form pastilles.

8. The catalyst pastille of claim 7 wherein said low-shear jacketed blender maintains a temperature that is from about 0° F. to about 20° F. above the congealing point of said hydrocarbon material.

9. The catalyst pastille of claim 7 wherein said powdered catalyst is reduced.

10. The catalyst pastille of claim 7 wherein said powdered catalyst has an average particle size of from about 1 μ to about 225 μ.

11. The catalyst pastille of claim 10 wherein said powdered catalyst has an average particle size of from about 3 μ to about 150 μ.

12. The catalyst pastille of claim 7 wherein said hydrocarbon material has a congealing point of from about 110° F. to about 250° F.

13. The catalyst pastille of claim 7 wherein said hydrocarbon material has a congealing point of from about 150° F. to about 225° F.

14. The catalyst pastille of claim 7 wherein said hydrocarbon material is selected from epoxy resin, fatty acids, fatty alcohols, fatty esters, fatty stearates, hydrocarbon resins, microcrystalline paraffins, synthetic wax, paraffin wax, polyesters, polyethylene glycol, polyethylene waxes, polyglycols, polyvinyl alcohols, polystyrene, vegetable waxes, a wax obtained from processes using coal, natural gas, biomass, or methanol as feedstock, a synthetic wax produced from a Fischer-Trospch reaction, wax blends and combinations thereof.

15. The catalyst pastille of claim 7 wherein said pastille comprises up to about 65 wt % catalyst.

16. The catalyst pastille of claim 7 wherein said pastille has a diameter of from about 2 mm to about 100 mm and a thickness of from about 1 mm to about 10 mm.

17. The catalyst pastille of claim 7 wherein said pastillator has a discharge temperature that is from about 2° F. to about 150° F. lower than the congealing point of said hydrocarbon material.

18. The catalyst pastille of claim 7 wherein said blender has at least one paddle and said paddle is positioned within said blender so as to minimize attrition of said powdered catalyst.

19. A catalyst pastille comprising an active powdered catalyst coated with a protective hydrocarbon coating material such that an essentially oxygen- and/or moisture barrier is created for the powdered catalyst, wherein said powdered catalyst defines a density and said coating material defines a density and the density of said powdered catalyst is greater than the density of said coating material, and wherein said catalyst pastille is prepared by the process comprising the steps of:
   a. Combining a hydrocarbon material having a congealing point with a powdered catalyst in a low-shear jacketed blender to form a mixture wherein said catalyst is uniformly dispersed throughout said hydrocarbon, said low-shear jacketed blender being set to maintain a temperature that is from about 0° F. to about 50° F. above the congealing point of said hydrocarbon material;
   b. Transferring said mixture from said low-shear jacketed blender to a pastillator at a temperature sufficient to maintain said hydrocarbon material in a semi-solid phase so as to avoid settling of the powdered catalyst; and
   c. Depositing at a blender end of said pastillator a plurality of drops of said mixture onto a steel belt cooler of predetermined length, and transporting said drops to a discharge end of said pastillator while cooling said drops to a temperature low enough to solidify said hydrocarbon phase to form pastilles having a diameter of from about 2 mm to about 100 mm and a thickness of from about 1 mm to about 10 mm.

20. The catalyst pastilles of claim 10 wherein said pastilles are spherical, hemispherical, ellipsoidal, oval, domed, flakes and combinations thereof.

* * * * *